(12) United States Patent
Ely

(10) Patent No.: US 9,563,887 B2
(45) Date of Patent: Feb. 7, 2017

(54) HELMET CLEANING APPARATUS

(71) Applicant: Chester Ely, Apopka, FL (US)

(72) Inventor: Chester Ely, Apopka, FL (US)

( * ) Notice: Subject to any disclaimer, the term of this patent is extended or adjusted under 35 U.S.C. 154(b) by 413 days.

(21) Appl. No.: 14/301,689

(22) Filed: Jun. 11, 2014

(65) Prior Publication Data

US 2014/0365360 A1    Dec. 11, 2014

Related U.S. Application Data

(60) Provisional application No. 61/833,708, filed on Jun. 11, 2013.

(51) Int. Cl.
| | |
|---|---|
| *B08B 3/00* | (2006.01) |
| *G06Q 20/24* | (2012.01) |
| *G06Q 20/10* | (2012.01) |
| *B08B 3/02* | (2006.01) |
| *A47L 5/38* | (2006.01) |
| *A42B 3/04* | (2006.01) |

(52) U.S. Cl.
CPC ............... *G06Q 20/24* (2013.01); *B08B 3/00* (2013.01); *G06Q 20/10* (2013.01); *A42B 3/0406* (2013.01); *A47L 5/38* (2013.01); *B08B 3/006* (2013.01); *B08B 3/02* (2013.01); *B08B 2230/01* (2013.01)

(58) Field of Classification Search
CPC ........... A47L 5/38; G06Q 20/24; G06Q 20/10; B08B 3/00; B08B 3/02; B08B 3/006; B08B 2230/01

IPC ........................................................ B08B 3/00
See application file for complete search history.

(56) References Cited

U.S. PATENT DOCUMENTS

| | | | |
|---|---|---|---|
| 2,434,404 A * | 1/1948 | Goodwin | D06F 43/002 |
| | | | 15/302 |
| 6,134,806 A | 10/2000 | Dhaemers | |
| 6,845,569 B1 | 1/2005 | Kim | |
| 8,388,900 B2 | 3/2013 | Benedek et al. | |
| 2004/0003511 A1 | 1/2004 | Silver | |
| 2009/0183301 A1 | 7/2009 | Brown et al. | |

* cited by examiner

*Primary Examiner* — David Redding
(74) *Attorney, Agent, or Firm* — Global Intellectual Property Agency, LLC; Daniel Boudwin

(57) ABSTRACT

Disclosed is a helmet cleaning apparatus. The apparatus includes a rectangular housing having a cleaning compartment with a transparent lid pivotally connected thereto. The compartment includes a helmet mount having a spheroidal shape and on which a helmet can be positioned for cleaning. The helmet mount further includes apertures thereon that are connected to a vacuum cleaning device and a steam cleaning device contained within the housing. In operation, a helmet is positioned on the helmet mount, and some of the apertures thereon disperse steam in order to clean the helmet. Other apertures draw debris and other materials into the vacuum cleaning device in order to remove the same from the helmet. In this way, a user can easily and conveniently sanitize and clean a helmet without having to manually cleaning the helmet.

10 Claims, 2 Drawing Sheets

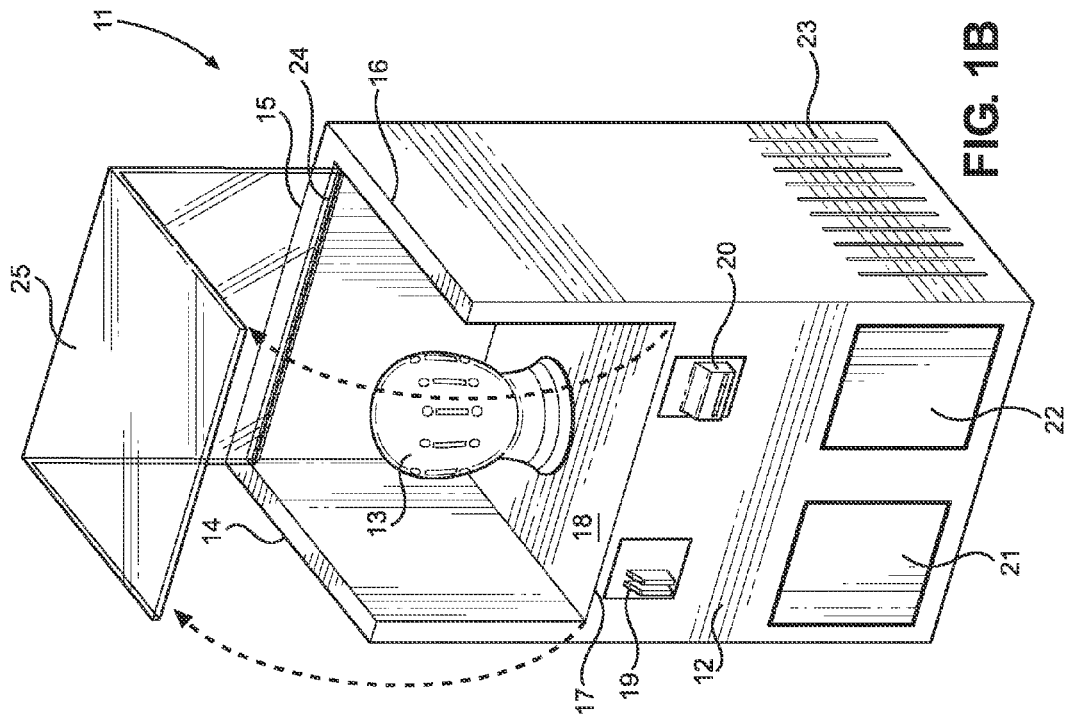
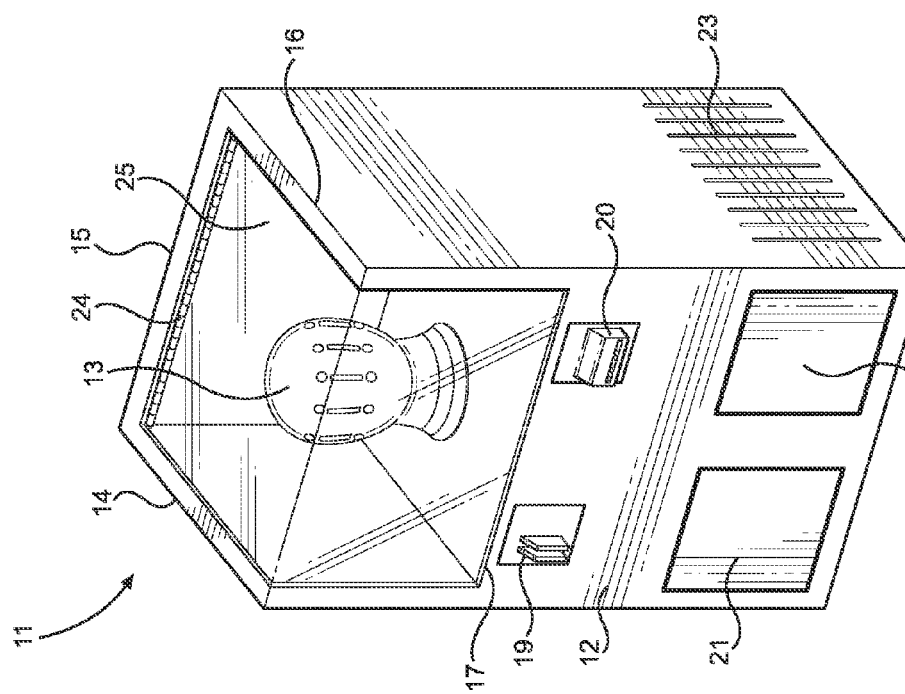

HELMET CLEANING APPARATUS

CROSS REFERENCE TO RELATED APPLICATION

This application claims the benefit of U.S. Provisional Application No. 61/833,708 filed on Jun. 11, 2013, entitled "Cheddar's Custom Cleaner." The above identified patent application is herein incorporated by reference in its entirety to provide continuity of disclosure.

BACKGROUND OF THE INVENTION

Field of the Invention

The present invention relates to a helmet cleaning apparatus. More specifically, the present invention describes a helmet cleaning apparatus comprising a housing having a cleaning compartment in which a helmet can be positioned. The housing encloses steam cleaning and vacuum cleaning devices that are used to clean a helmet disposed within the cleaning compartment. In this way, the helmet can be positioned within the cleaning compartment and can be cleaned and sanitized in an efficient manner.

Motorcyclists commonly wear helmets in order to protect themselves in the event of a crash. Additionally, such protective helmets are also commonly worn by various athletes, such as snowboarders and motocross riders, among others. In addition to protecting the rider in the event of a crash, helmets also help to prevent debris from contacting the rider's face and help to improve visibility for the rider.

However, helmets can often become dirty and worn after prolonged use. Further, the interior of the helmet can develop an odor and can be sweaty from frequent use by a rider. Cleaning a helmet by hand can be difficult, and often users are unable to completely clean and sanitize the helmet. As a result, the helmet may become aesthetically unappealing, and the rider may choose to replace an old helmet rather than clean the helmet.

Thus, the present invention discloses a helmet cleaning apparatus. The device includes a substantially rectangular housing with a cleaning compartment disposed on an upper region thereof. The cleaning compartment is adapted to receive a motorcycle helmet therein. The cleaning compartment includes a helmet mount therein on which a helmet can be securely positioned. The cleaning compartment can be enclosed by a transparent lid pivotally connected thereto. The housing further includes a steam cleaning device that can sanitize the helmet using steam. Further, the housing includes a vacuum cleaning device that can remove debris from the motorcycle helmet. The steam cleaning device and the vacuum cleaning device are enclosed within an interior volume of the housing. Steam is produced by the steam cleaning device, flows through one or more steam tubes, and escapes through apertures disposed on the helmet mount. Similarly, the vacuum cleaning device produces suction and draws debris through apertures on the helmet mount and through vacuum tubes. Preferably, the present invention requires a user to make a payment prior to utilizing the cleaning modes provided by the present invention, and users may pay by inserting cash into a currency detector, or may swipe a credit card through a credit card reader. Thus, the present invention provides a simple and convenient means for cleaning a motorcycle helmet without requiring the user to manually scrub or clean the helmet.

Description of the Prior Art

Devices have been disclosed in the prior art that relate to sports equipment cleaning devices. These include devices that have been patented and published in patent application publications. These devices generally relate to cleaning devices that generate and circulate ozone. The following is a list of devices deemed most relevant to the present disclosure, which are herein described for the purposes of highlighting and differentiating the unique aspects of the present invention, and further highlighting the drawbacks existing in the prior art.

One such patent, U.S. Pat. No. 8,388,900 to Benedek et al. discloses an assembly and method for treating the air and removing impurities from the air within an enclosed volume, such as a storage container. Ozone is generated using a UV light source, and is exposed to the material stored within the enclosed volume and is subsequently removed therefrom. The assembly can be used to treat contaminated sports equipment or food storage containers. Thus, Benedek fails to disclose a device suited to clean helmets and does not include a steam cleaning device or vacuum cleaning device.

U.S. Pat. No. 6,134,806 to Dhaemers discloses a sports equipment bag connected to an ozone generator adapted to dry sports equipment and objects within the bag, and further to destroy bacteria within the bag. Thus, similar to Bendek, Dhaemers discloses a device that cleans objects by exposing the objects to ozone. However, Dhaemers fails to disclose a device comprising a steam cleaning device or a vacuum cleaning device.

U.S. Patent Application Publication Number 2004/0003511 to Silver discloses a device for cleaning sports equipment comprising a cabinet having an interior volume in which ozone can be circulated by fans. The interior volume can be enclosed so that the ozone can fill the same and such that ozone cannot escape the cabinet. A fluid storage device is further provided to spray fluid into the cabinet to aid in depleting ozone within the cabinet. Thus, Silver discloses a device for cleaning sports equipment, but fails to disclose a device adapted for cleaning helmets that includes a steam cleaning device and a vacuum cleaning device.

U.S. Patent Application Publication Number 2009/0183301 to Brown et al. discloses a helmet comprising a one-piece shell having a rearwardly projecting brim such that the user appears to be wearing a conventional baseball helmet backwards. The helmet further includes an impact absorbing liner and can include logos on the exterior thereof. Thus, Brown et al. differs from the purpose and intent of the present invention and discloses a helmet having a particular construction. Brown et al. fails to disclose a device for cleaning or sanitizing a helmet.

U.S. Pat. No. 6,845,569 to Kim discloses a shoe drying apparatus that circulates ozone in an airtight compartment in order to deodorize and sanitize the shoes. The device includes a housing having a compartment in which shoes can be positioned, and includes means for generating and circulating ozone. Thus, Kim discloses a device for sanitizing shoes, but fails to disclose a device adapted to sanitize helmets and that includes a steam cleaning device and a vacuum cleaning device.

These prior art devices have several known drawbacks. Several devices in the prior art are adapted to clean sports equipment. However, such devices are not specially adapted to clean helmets. The unique shape of a helmet requires a cleaning device that can clean the interior of a helmet, and thus the prior art devices are not suited for cleaning a helmet. Further, many devices in the prior art relate to producing ozone in a confined volume for sanitizing sports equipment. However, ozone is harmful to the environment and may be harmful to human health.

In light of the devices disclosed in the prior art, it is submitted that the present invention substantially diverges in design elements from the prior art and consequently it is clear that there is a need in the art for an improvement to existing helmet cleaning devices. In this regard the instant invention substantially fulfills these needs.

SUMMARY OF THE INVENTION

In view of the foregoing disadvantages inherent in the known types of sports equipment cleaning devices now present in the prior art, the present invention provides a new helmet cleaning apparatus wherein the same can be utilized for providing convenience for the user when cleaning and sanitizing a helmet.

It is therefore an object of the present invention to provide a new and improved helmet cleaning apparatus that has all of the advantages of the prior art and none of the disadvantages.

It is another object of the present invention to provide a helmet cleaning apparatus that is specially adapted to clean the interior of a helmet, such as a motorcycle helmet, a bike helmet, sports helmets, or the like.

Another object of the present invention is to provide a helmet cleaning apparatus that utilizes steam to sanitize the helmet.

Yet another object of the present invention is to provide a helmet cleaning apparatus that utilizes a vacuum cleaner to remove debris from the helmet.

A further object of the present invention is to provide a helmet cleaning apparatus that allows a user to easily clean a helmet without manually scrubbing the helmet.

Another object of the present invention is to provide a helmet cleaning apparatus that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1A shows a perspective view of the helmet cleaning apparatus of the present invention with the lid in a closed configuration.

FIG. 1B shows a perspective view of the helmet cleaning apparatus of the present invention with the lid in an open configuration.

DETAILED DESCRIPTION OF THE INVENTION

Figure 2A:
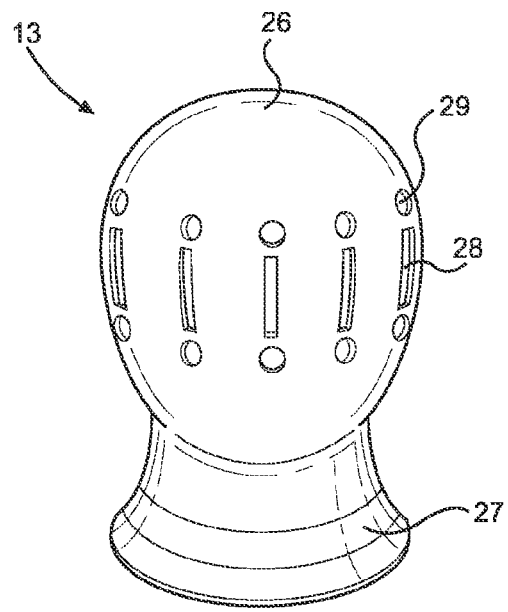
FIG. 2A shows a close-up view of the helmet mount of the present invention.

Reference is made herein to the attached drawings. Like reference numerals are used throughout the drawings to depict like or similar elements of the helmet cleaning apparatus. For the purposes of presenting a brief and clear description of the present invention, the preferred embodiment will be discussed as used for cleaning the interior of a helmet, such as a motorcycle helmet. The figures are intended for representative purposes only and should not be considered to be limiting in any respect.

Referring now to FIGS. 1A and 1B, there are shown perspective views of the helmet cleaning apparatus of the present invention with the lid in closed and open configurations, respectively. The helmet cleaning apparatus 11 of the present invention comprises a housing 12 that is substantially rectangular. The housing 12 includes a first side 14 opposite a second side 16, and a front end 17 opposite a rear end 15. The housing 12 further includes an interior compartment that houses a steam cleaning device and a vacuum cleaning device. The interior compartment is disposed within a lower portion of said housing 12 and is substantially enclosed by the housing 12. The housing 12 includes a plurality of air vents 23 on a lower portion thereof to allow heat generated by the steam cleaning device and vacuum cleaning device to be exhausted from the housing 12, and to facilitate air circulation. The helmet cleaning apparatus 11 is preferably powered by connection to a conventional power outlet; however, the helmet cleaning apparatus 11 may be powered by other means.

The housing 12 further comprises a cleaning compartment having a helmet mount 13 therein. The cleaning compartment comprises an upper region of the housing 12 and is located above the interior compartment of the housing 12. The cleaning compartment is accessible from the exterior of the helmet cleaning apparatus 11. The cleaning compartment is defined by a bottom surface 18, and walls on said first side 14, second side 16, and the rear end 15 of the housing 12. Thus, the front end 17 and the top of the cleaning compartment are open. The helmet mount 13 comprises a spheroidal shape adapted to have a helmet placed thereon. In this way, the helmet mount 13 resembles the shape of a human head. The helmet mount 13 is disposed on a bottom surface 18 of the cleaning compartment and is located centrally therein. The open front and top of the cleaning compartment allows a user to easily place a helmet on the helmet mount disposed therein.

The open front end 17 and top of the cleaning compartment can be removably covered by means of an L-shaped lid 25. The L-shaped lid 25 pivots about a hinge 24 disposed along an upper portion of said rear end 15 of the housing 12. The L-shaped lid 25 can pivot about the hinge 24 so as to enclose the cleaning compartment, or so as to allow access thereto. The L-shaped lid 25 is preferably composed of Plexiglas, or other suitable durable, transparent material. In this way, a user can watch as his or her helmet is cleaned within the cleaning compartment, and can easily identify when the cleaning process has ended. In some embodiments of the present invention, an end of the lid 25 opposite the hinge 24 includes a lock or latch thereon. The latch is adapted to engage with a mating latch disposed on said front 17 end of the housing 12 on the bottom surface 18 of the cleaning compartment. In this way, the lid 25 can be locked in a closed configuration so that it is not accidentally or unintentionally opened during the cleaning process.

The front end 17 of the housing further includes a pair of hinged doors 21, 22 thereon. The doors 21, 22 provide access to the interior of the housing 12 in which the steam cleaning device and vacuum cleaning device are positioned. The door 21 can be opened so as to provide access to the vacuum cleaning device for maintenance or cleaning. Similarly, the door 22 can be opened so as to provide access to the steam cleaning device for maintenance or cleaning. Preferably, the doors 21, 22 further include handles thereon to facilitate opening of the same, and further include locks thereon to prevent unauthorized users from accessing the interior of the helmet cleaning apparatus 11 of the present invention.

In a preferred embodiment of the present invention, the helmet cleaning apparatus 11 is adapted to require payment in order for a user to clean his or her helmet. The helmet cleaning apparatus 11 includes a control circuit adapted to control the operation of the helmet cleaning apparatus, such as determining whether a required amount of payment has been made, activating the steam cleaning device and vacuum cleaning device, and turning off said steam and vacuum cleaning devices after a preset period of time. In operation, a user can provide payment in order to open the lid of the housing in order to have his or her helmet cleaned. Once payment has been made, the user can position the dirty helmet on the helmet mount and seal the lid. The apparatus may then automatically begin the cleaning process or may require the user to operate a control to indicate that the cleaning process should begin.

Accordingly, the front end 17 of the housing 12 includes means for accepting payment from a user. In some embodiments of the present invention, the housing 12 comprises a currency detector 20 positioned thereon that is adapted to receive paper currency or coins, and dispense an appropriate amount of change, if so required. Thus, the currency detector 20 further includes a storage receptacle for storing money fed into the currency detector 20 by users, and a change dispenser having a plurality of various coins therein for providing users with the correct amount of change. Further, in some embodiments, the housing 12 includes a credit card reader 19 or other similar payment receiving means with a network connection that allows users to pay by swiping a credit card or debit card through the credit card reader 19. The user's credit card or debit card will then be charged with the amount required to operate the helmet cleaning apparatus 11. In this way, a user can use a desired payment method in order to activate the helmet cleaning apparatus 11 of the present invention.

Figure 2B:
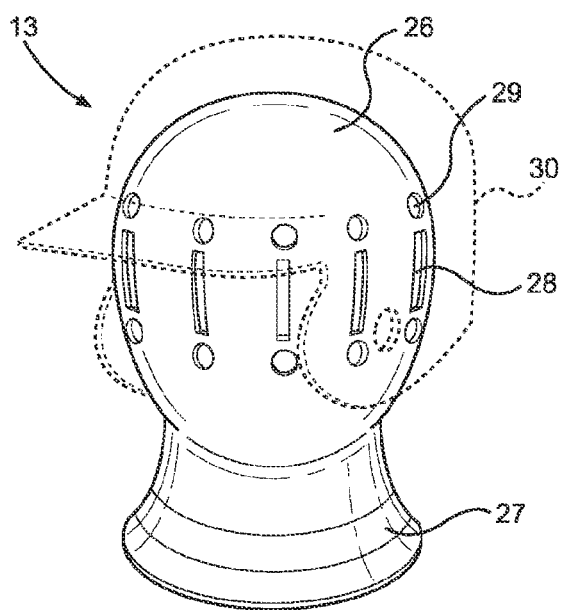
FIG. 2B shows a close-up view of the helmet mount of the present invention with a helmet thereon.

Referring now to FIGS. 2A and 2B, there are shown close-up views of the helmet mount of the present invention with and without a helmet thereon. The helmet mount 13 of the present invention comprises an upper end 26 and a lower end 27. The lower end 27 is secured to the bottom of the cleaning compartment, such that the helmet mount 13 is disposed in an upright orientation. The lower end 27 is preferably narrow relative to the upper end 26 of the helmet mount 13. The upper end 26 of the helmet mount 13 comprises a spheroidal shape adapted to receive a helmet 30 thereon. Thus, the helmet mount 13 is shaped similarly to a human head. Various types of helmets can be positioned on the helmet mount 13 for cleaning, including but not limited to, motorcycle helmets, baseball helmets, and football helmets.

The helmet mount 13 further includes one or more vacuum apertures 28 thereon, and one or more steam apertures 29 thereon. The vacuum apertures 28 and the steam apertures 29 are disposed on various portions of the upper end 26 of the helmet mount 13. The vacuum and steam apertures 28, 29 can be disposed in a variety of patterns and can comprise any of a variety of shapes. In a preferred embodiment, the steam apertures 28 have a circular shape, whereas the vacuum apertures 29 have a rectangular shape, and are relatively large. The vacuum apertures 29 are relatively large so that debris of various sizes that is stuck to the interior of a helmet 30 can be drawn into the vacuum apertures 29.

Figure 3:
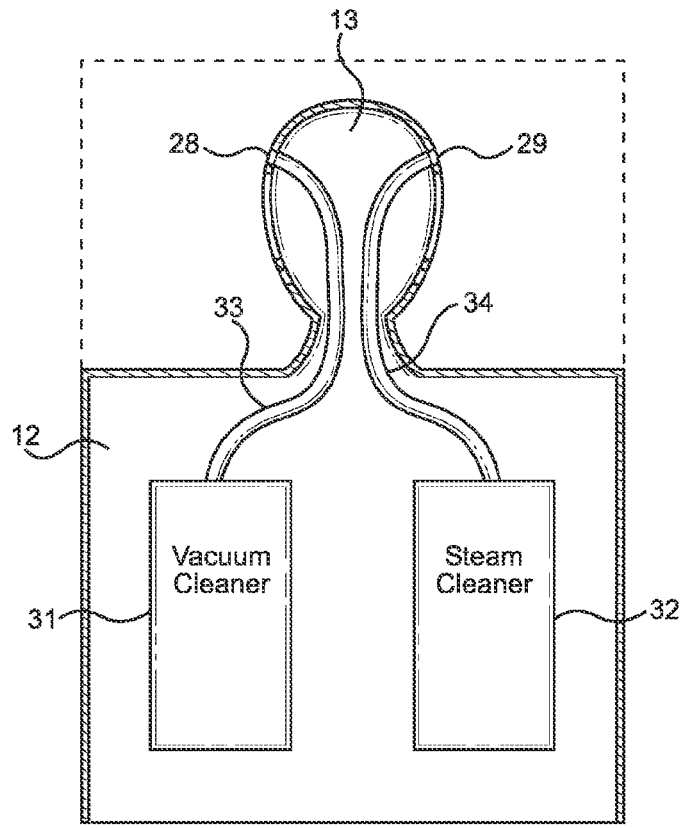
FIG. 3 shows a cut-out view of the helmet cleaning apparatus of the present invention.

Referring now to FIG. 3, there is shown a cut-out view of the helmet cleaning apparatus of the present invention. The housing 12 of the present invention includes an interior volume in which a vacuum cleaning device 31 and a steam cleaning device 32 are disposed. Preferably, the vacuum cleaning device 31 and steam cleaning device 32 are separate devices. Furthermore, the devices are preferably disposed on a left half and right half of the housing, in a side by side orientation. In this way, the vacuum and steam cleaning devices 31, 32 are separately accessible for cleaning and maintenance.

The vacuum cleaning device 31 serves to create suction so as to draw debris from a helmet positioned on the helmet mount 13. The vacuum cleaning device is of conventional construction and comprises a vacuum motor adapted to create a low pressure area, a breathable or porous vacuum bag for collecting debris, and exhaust vents for allowing air drawn into the vacuum cleaning device to escape the same. The helmet mount 13 includes one or more vacuum apertures 28 thereon that are each connected to the vacuum cleaning device 31 via one or more vacuum tubes 33. The vacuum tubes 33 are preferably elongated tubular members having a hollow interior through which air can flow. In this way, the vacuum apertures 28 serve as the intake of the vacuum cleaning device 31 and provide suction to the interior of a helmet 30 disposed on the helmet mount 13 in order to draw debris from the helmet 30, through the vacuum aperture 28, through the vacuum tubes 33, and into a vacuum bag of the vacuum cleaning device 31. One or more vacuum apertures 28 are provided on the helmet mount 13, and the vacuum apertures 28 may be disposed in various locations on the helmet mount 13 so as to draw debris from the entirety of the interior of a helmet.

The steam cleaning device 32 comprises a water reservoir and heating means to produce steam from boiling water, and releases the steam through steam apertures 29 disposed on the helmet mount 13. One or more steam apertures 29 are variously positioned on the helmet mount 13 so as to expose the interior of the helmet to steam for cleaning and sanitization. The steam is produced by the steam cleaning device 32, flows through one or more steam tubes 34 which terminate at the steam apertures 29 such that steam can escape the helmet mount 13 through the steam apertures 29.

In operation, a user can make a payment using the credit card reader or the currency detector disposed on the housing. Upon receiving payment, the user may lift the lid in order to gain access to the cleaning compartment and the helmet mount therein. In some embodiments of the present invention, the lid may be locked until the user provides payment. Once payment has been made, the user can then position his or her helmet on the helmet mount similarly to how the user would position a helmet on his or her own head. In this way, some of the apertures on the helmet mount will be directed towards the interior of the helmet. Once the helmet is positioned on the helmet mount, the user can close the lid. During the cleaning process, the lid may automatically lock to prevent a user from prematurely removing the helmet, and to prevent users from being burned by the steam produced by the vacuum cleaning apparatus. Once the helmet is properly positioned, the user may be allowed to select the desired cleaning mode, such as vacuuming the helmet, steam cleaning the helmet, or both. The cleaning apparatus then vacuums and steam cleans the helmet for a preset period of time. Thus, the present invention may comprise a timer means to control the operation of the vacuum cleaning device 31 and the steam cleaning device 32. Once cleaning is complete, the user may open the lid and remove his or her helmet from the helmet cleaning apparatus.

Where both cleaning modes are selected, the steam cleaning is preferably performed first. Once the steam cleaning is completed, the vacuum cleaning device activates for a preset period of time. By performing the steam cleaning and then the vacuum cleaning, the helmet will have time to cool having been exposed to the steam. Further, the vacuum draws steam remaining in the cleaning chamber into the vacuum cleaning device. Upon completion of the cleaning modes, the lid may automatically unlock so that the user can safely open the lid of the helmet cleaning apparatus. In some embodiments, the lid may automatically unlock after a preset amount of time so that the helmet will be cooled and the steam will be evacuated from the cleaning chamber.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A helmet cleaning apparatus comprising:
a rectangular housing having an interior compartment and a cleaning compartment disposed above said interior compartment;
wherein said interior compartment comprises a steam cleaning device and a vacuum cleaning device;
wherein said cleaning compartment comprises a helmet mount adapted to receive a helmet thereon, and wherein said helmet mount further comprises one or more steam apertures and one or more vacuum apertures thereon;
wherein said steam cleaning device is connected to said one or more steam apertures by means of steam tubes so that steam can be supplied from said steam cleaning device to said cleaning compartment;
wherein said vacuum cleaning device is connected to said one or more vacuum apertures by means of vacuum tubes so that suction is created within said cleaning compartment.

2. The helmet cleaning apparatus of claim 1, wherein said cleaning compartment further comprises a lid pivotally secured thereto by means of a hinge.

3. The helmet cleaning apparatus of claim 2, wherein said lid is transparent.

4. The helmet cleaning apparatus of claim 2, wherein said lid comprises a lock thereon for enclosing said cleaning compartment and preventing access thereto.

5. The helmet cleaning apparatus of claim 1, wherein said helmet mount comprises a lower end attached to a bottom surface of said cleaning compartment, and an upper end having a spheroidal shape.

6. The helmet cleaning apparatus of claim 1, wherein said one or more steam apertures are circular in shape, and wherein said one or more vacuum apertures are rectangular in shape.

7. The helmet cleaning apparatus of claim 1, further comprising a device for accepting payment from a user.

8. The helmet cleaning apparatus of claim 7, wherein said device for accepting payment comprises a credit card reader.

9. The helmet cleaning apparatus of claim 7, wherein said device for accepting payment comprises a currency detector.

10. The helmet cleaning apparatus of claim 1, further comprising one or more hinged doors that provide access to the interior compartment of said housing.

* * * * *